US010418878B2

(12) United States Patent
Berry

(10) Patent No.: US 10,418,878 B2
(45) Date of Patent: Sep. 17, 2019

(54) PORTABLE FUEL PUMP

(71) Applicant: TUTHILL CORPORATION, Fort Wayne, IN (US)

(72) Inventor: Jacob J. Berry, Uniondale, IN (US)

(73) Assignee: Tuthill Corporation, Fort Wayne, IN (US)

( * ) Notice: Subject to any disclaimer, the term of this patent is extended or adjusted under 35 U.S.C. 154(b) by 0 days.

(21) Appl. No.: 15/468,479

(22) Filed: Mar. 24, 2017

(65) Prior Publication Data

US 2017/0201146 A1  Jul. 13, 2017

Related U.S. Application Data

(63) Continuation of application No. 14/516,143, filed on Oct. 16, 2014, now Pat. No. 9,605,673.
(Continued)

(51) Int. Cl.
*F03C 2/00* (2006.01)
*F03C 4/00* (2006.01)
(Continued)

(52) U.S. Cl.
CPC ............... *H02K 5/225* (2013.01); *F01C 1/44* (2013.01); *F04C 2/344* (2013.01); *F04C 2/44* (2013.01); *F04C 14/04* (2013.01); *F04C 14/06* (2013.01); *F04C 14/28* (2013.01); *F04C 15/008* (2013.01); *F04C 15/06* (2013.01); *F04C 28/04* (2013.01);
(Continued)

(58) Field of Classification Search
CPC .. F04C 2/344; F04C 15/008; F04C 2210/203; F04C 2240/40; F04C 2240/803; H02K 3/50; H02K 5/225; H02K 7/14; H02K 11/022; H02K 2203/03; H01R 13/2519;
(Continued)

(56) References Cited

U.S. PATENT DOCUMENTS 1,516,053 A    11/1924 Morgan
4,401,416 A *   8/1983 Tuckey ............... F04C 2/3447
                                                  417/310
(Continued)

FOREIGN PATENT DOCUMENTS

DE        3344181        6/1984
GB        2188678       10/1987
WO    WO 2015/058061 A1  4/2015

OTHER PUBLICATIONS

European Search Report; dated Sep. 22, 2017.
(Continued)

*Primary Examiner* — Theresa Trieu
(74) *Attorney, Agent, or Firm* — Barnes & Thornburg LLP

(57) ABSTRACT

An illustrative embodiment of the present disclosure includes a pump having a rotor and a plurality of vanes. The rotor is attached to a motor that rotates it in first and second directions and is located in a cavity. The plurality of vanes are each pivotally coupled to the rotor so as the rotor rotates, the vanes selectively push fluid from an inlet port out through an outlet port. The plurality of vanes each have an end selected from the group consisting of a lobe, no lobe, and a rod located in the lobe. Each of the plurality of vanes also includes a pivot pin configured to fit in a corresponding receptacle located in the rotor so that each of the plurality of vanes is pivotable with respect to the rotor inside the cavity.

18 Claims, 19 Drawing Sheets

Related U.S. Application Data

(60) Provisional application No. 61/892,058, filed on Oct. 17, 2013.

(51) Int. Cl.

| | |
|---|---|
| F04C 2/00 | (2006.01) |
| H02K 5/22 | (2006.01) |
| F01C 1/44 | (2006.01) |
| F04C 28/04 | (2006.01) |
| F04C 2/44 | (2006.01) |
| F04C 14/04 | (2006.01) |
| F04C 14/28 | (2006.01) |
| F04C 15/06 | (2006.01) |
| F04C 2/344 | (2006.01) |
| F04C 15/00 | (2006.01) |
| H01R 13/52 | (2006.01) |
| H01R 13/622 | (2006.01) |
| H01R 13/652 | (2006.01) |
| H02K 7/14 | (2006.01) |
| H02K 11/22 | (2016.01) |
| F04C 14/06 | (2006.01) |
| F01C 21/08 | (2006.01) |

(52) U.S. Cl.
CPC ....... *H01R 13/5219* (2013.01); *H01R 13/622* (2013.01); *H01R 13/652* (2013.01); *H02K 7/14* (2013.01); *H02K 11/022* (2013.01); *F01C 21/0809* (2013.01); *F04C 2210/203* (2013.01); *F04C 2240/40* (2013.01); *F04C 2240/803* (2013.01)

(58) Field of Classification Search
CPC .... H01R 13/622; H01R 39/38; H01R 39/383; H01R 39/39
USPC .... 418/266–268, 239, 32; 310/71, 238–239; 417/310, 352, 238
See application file for complete search history.

(56) References Cited

U.S. PATENT DOCUMENTS

| | | | | |
|---|---|---|---|---|
| 4,960,371 | A | 10/1990 | Bassett | |
| 6,086,332 | A * | 7/2000 | Barker | F04C 2/3442 417/238 |
| 6,106,255 | A * | 8/2000 | Viegas | F01C 21/0809 418/268 |
| 7,338,267 | B2 * | 3/2008 | Patterson | F01C 21/0809 418/268 |
| 9,605,673 | B2 * | 3/2017 | Berry | F04C 2/44 418/268 |
| 2005/0196299 | A1 | 9/2005 | Patterson | |

OTHER PUBLICATIONS

European Patent Search Report; dated May 18, 2017.
European Office Action: European Application No. 14 854 438.0-1004; Reference No. P/74980.EP01; dated Dec. 14, 2018.

\* cited by examiner

PORTABLE FUEL PUMP

RELATED APPLICATIONS

The present application is a continuation of application Ser. No. 14/516,143, filed on Oct. 16, 2014, entitled "Portable Fuel Pump" and claims priority to U.S. Provisional Patent Application, Ser. No. 61/892,058 filed on Oct. 17, 2013, entitled "Portable Fuel Pump." To the extent not included below, the subject matter disclosed in those applications is hereby expressly incorporated into the present application

TECHNICAL FIELD AND SUMMARY

The present disclosure relates to rotary vane pumps. More particularly, this disclosure relates to a portable rotary vane pump including a variety of improved features that enhance the operation and utility of the pump.

Rotary vane pumps are particularly useful for pumping liquid, such as gasoline and other fuels, from a storage tank to a vehicle, for example. It is appreciated that such a pump may be configured for any variety of other liquids from any variety of first locations to any variety of second locations. According to an illustrative embodiment, a pump of this disclosure may include variable direction ports. In particular, the inlet and outlet ports may be adjusted so they can each be independently directed in a plurality of directions. For example, the inlet and outlet ports may be positioned linearly with each other. Alternatively, one of the ports, such as the outlet port, may be repositioned so it is oriented perpendicular to the inlet port and vice versa. Still alternatively, both ports may be oriented parallel to each other. This offers flexibility to the operator to match the configuration of the inlet and outlet ports that best serves the particular needs at the time.

Another illustrative embodiment of the pump of the present disclosure may include interchangeable vanes. It is contemplated that the pump may include vanes having a plurality of configurations intended to achieve particular results. For example, some vanes may include lobes and rods having increased mass which may affect flow output and discharge head. Other vanes may not include any load to decrease mass which might decrease flow output and discharge head. These vanes may be changed from the rotor based on the needs of the pump. Each of these different vanes, however, have the same attachment structure so even though each vane produces different flow configurations, they can be added to the same rotor. This translates into changing fewer parts in order to change the pump's flow characteristics. Vane geometry is also an important mechanism in altering performance characteristics. Each set of vanes of any configuration also works to seal off on the cavity wall, prior to pumping any media, producing a partial vacuum while dry which enables the pump to self-prime.

Another embodiment of the present disclosure includes a hinged vane relief mechanism. A typical rotary vane pump requires a bypass valve. For those pumps, when the outlet of the pump is closed off, fluid passes back to the supply reservoir via the bypass valve. Without such a valve, the pressure would cause excessive load on the drive mechanism and potentially damage it. In this embodiment of a pump, the vane is hinged so when the outlet is closed off, the vanes are no longer able to seal off the cavity wall due to the pressure. The rotor may still rotate the vanes, but no fluid is moving. The hinged vanes are self-regulating and react to the outlet pressure. So when the outlet is reopened, the outlet pressure drops causing the vanes to move back and seal off the cavity wall and begin to move fluid again, making the pump no longer of the positive displacement variety.

Another illustrative embodiment of the present disclosure includes the pump having a reversible rotor. Typically, rotation of the motor, rotor, and vanes move counterclockwise to pump fluid. The configuration of the rotor and vanes allows them to be reversed in the chamber by removing the rotor and vanes as a unit, turning them over, and then inserting them in backwards. According to the present disclosure, the vanes in the pump may be reversed which allows it to function, but the vanes will not de-latch from the chamber wall and, thus, not create any bypass function. If the motor's direction of rotation is reversed and rotor and vanes are turned over end for end, the pump will then turn in a clockwise direction and the pump will function with the bypass feature. This configuration may be desirable in installations that require the inlet port location to then become the outlet port and vice versa.

Another illustrative embodiment of the pump may include a high-pressure relief gland. The gland is an opening or channel located at the bottom of the pump cavity. With this gland some of the fluid volume may blow back to a previously hinged cavity. By allowing fluid movement between cavities created by the rotor, high pressure fluid from one chamber may be displaced into an adjacent chamber (high pressure to low pressure, for example) to assist in preventing cavitation, thus, creating more even flow.

Another illustrative embodiment may include an inline toggle switch on the pump. This feature demonstrates how the electrical actuation mechanism utilizes a commodity switch coupled to a straight rod to activate the pump. A cross hole is used to engage the switch toggle. A through hole in the casing has adequate length for a two-sided cylindrical flame path joint. Typical construction of these types of joints in explosion-proof motors and enclosures normally involves overly complex mechanisms and components to actuate a switch. This disclosure significantly simplifies the manner in which the switch is actuated while achieving an explosion-proof joint. O-rings on the straight rod achieve a weather-type seal.

Another illustrative embodiment includes an improved power cord that may include one or more of the following features: a key-shaped design to ensure proper current and ground location in the electrical unit itself; configured to receive a ground pin on the interior potted pinned connection that is longer, making the ground connection the first contact when coupled to the pump and the last to break when removing from the pump; a coupler nut securing the power cord connection to the pump itself creating a weather-tight seal; a ring being an integral part of the plug socket itself; and the ring allowing a UL compliant flame path between the power cord and the pump housing. It is appreciated that the rings may be fabricated from any variety of appropriate materials such as aluminum, brass, bronze, steel, and stainless steel. By maintaining the relative position of the coupler nut to the plug geometry, as the nut is threaded and unthreaded onto the housing, a safe insertion and removal is accomplished if the connection is made or broken while still energized in a hazardous location. This is achieved by maintaining thread engagement with the coupler nut while maintaining a flame path with the integral ring at the same time the connection is broken at the power lead terminals. A printed circuit board (PCB) may also be included that houses a capacitor to provide electromagnetic interference (EMI) shielding to the pump. Properly located, the capacitor provides an effective means of suppressing EMI at the entrance of the incoming power connection. The capacitor is coupled to both power leads, as well as the grounding lead. The PCB is located in a position that provides solid contact between the ground plan of the board (which is connected to the grounding lead) and an exposed grounding surface in the mating housing. By grounding the board that houses the capacitor in this manner, the EMI is effectively suppressed.

Another illustrative embodiment of the present disclosure provides a pump comprising a rotor and a plurality of vanes. The rotor is attached to a motor that rotates it in first and second directions and is located in a cavity. The plurality of vanes are each pivotally coupled to the rotor so as the rotor rotates, the vanes selectively push fluid from an inlet port out through an outlet port. The plurality of vanes each have an end selected from the group consisting of a lobe, no lobe, and a rod located in the lobe. Each of the plurality of vanes also includes a pivot pin configured to fit in a corresponding receptacle located in the rotor so that each of the plurality of vanes is pivotable with respect to the rotor inside the cavity.

In the above and other illustrative embodiments, the pump may further include any one or more of the following: an inlet port that is selectively positionable with respect to the pump housing via fasteners; an outlet port that is selectively positionable with respect to the pump housing via fasteners; relative positioning between the outlet port and the inlet port is selected from the group consisting of the inlet port being positioned coaxial with the outlet port, the inlet port being positioned perpendicular to the outlet port, and the inlet port being positioned parallel with the outlet port on the pump; the pump does not include a bypass valve, but wherein the plurality of vanes are pivotable with respect to the rotor and are configured to not engage the cavity wall when the outlet port is sealed, so when the rotor is still rotating, the vanes will not move substantial fluid toward the outlet port, but will work to build/maintain a designated outlet pressure based on the variable vane characteristics; the rotor cavity includes a gland in fluid communication with the cavity such that the glad straddles an arm on the rotor to allow fluid communication between one side of the arm to the other side of the arm; a toggle switch that is engaged by a rod that moves linearly back and forth in the pump/motor housing which allows the pump to be activated or deactivated without disconnecting the power cord; a power cord including features selected from the group consisting of a key flat that determines current and grounding location at the electrical union, a ground pin extended longer than other electrical connections such that the ground pin engages the pump prior to the electrical connections when connecting to the pump and remains connected to the pump after the electrical connections are disconnected from the pump, and a coupler nut; the rotor rotates in first and second directions; and the rotor being positioned offset to a center point in the cavity.

Another illustrative embodiment of the present disclosure provides a pump comprising a rotor, a plurality of vanes, inlet and outlet ports, and a motor. The rotor is attached to the motor that rotates the rotor in first and second directions. The rotor is located in a cavity. The plurality of vanes are each pivotally coupled to the rotor so as the rotor rotates, the vanes selectively push fluid from an inlet port out through an outlet port. The inlet port is selectively positionable with respect to the pump housing via fasteners. The outlet port is selectively positionable with respect to the pump housing via fasteners. Relative positioning between the outlet port and the inlet port is selected from the group consisting of the inlet port being positioned coaxial with the outlet port. The inlet port is positioned about perpendicular to the outlet port, and the inlet port is positioned about parallel with the outlet port on the pump.

In the above and other illustrative embodiments, the pump may further include any one or more of the following: the plurality of vanes each having an end selected from the group consisting of a lobe, no lobe, and a rod located in the lobe; each of the plurality of vanes including a pivot pin configured to fit in a corresponding receptacle located in the rotor so that each of the plurality of vanes is pivotable with respect to the rotor inside the cavity; the pump does not include a bypass valve, but wherein the plurality of vanes are pivotable with respect to the rotor and are configured to not engage the cavity wall when the outlet port is sealed, so when the rotor is still rotating, the vanes will not move substantial fluid toward the outlet port to build pressure; the rotor cavity includes a gland in fluid communication with the cavity such that the gland straddles an arm on the rotor to allow fluid communication between one side of the arm to the other side of the arm; a toggle switch that engages a rod that moves linearly back and forth in the pump which allows the pump to be activated or deactivated without disconnecting the power cord; a power cord including features selected from the group consisting of a key flat that determines current and grounding locations at the electrical union, a ground pin extended longer than other electrical connections such that the ground pin engages the pump prior to the electrical connections when connecting to the pump and remains connected to the pump after the electrical connections are disconnected from the pump and a coupler nut; the rotor rotates in first and second directions; and the rotor is positioned offset to a center point in the cavity.

Additional features and advantages of the portable fuel pump assembly will become apparent to those skilled in the art upon consideration of the following detailed description of the illustrated embodiments exemplifying best modes of carrying out the fuel pump assembly as presently perceived.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the portable fuel pump, and such exemplification is not to be construed as limiting the scope of the portable fuel pump in any manner.

DETAILED DESCRIPTION OF THE DRAWINGS

Figure 1:
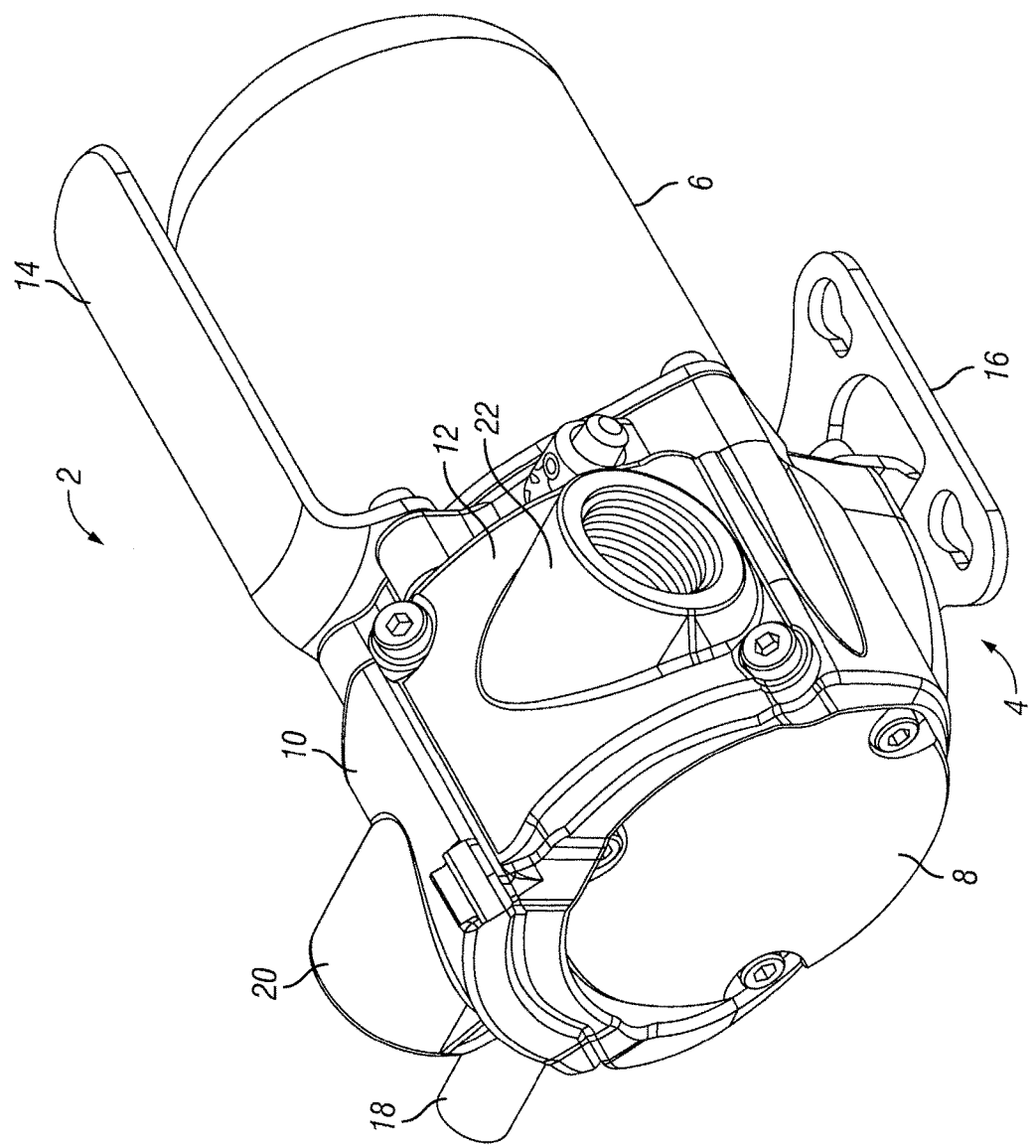
FIG. 1 is a top right-hand perspective view of a portable fuel pump.

A top right-hand perspective view of a portable fuel pump 2 is shown in FIG. 1. This view shows pump 2 including pump housing 4 attached to motor housing 6. Rotor cover 8 is attached to pump housing 4. Inlet and outlet port flanges 10 and 12, respectively, are also coupled to and extend from pump housing 4. Handle 14 is attached to pump 2, as well as base bracket 16. Power cord 18 attaches to a power socket 102 (see, also, FIG. 15) on pump 2 to provide power to the motor. It is appreciated that, with respect to inlet port flange 10 and outlet port flange 12, they include inlet port 20 and outlet port 22, respectively, as shown.

Figure 2:
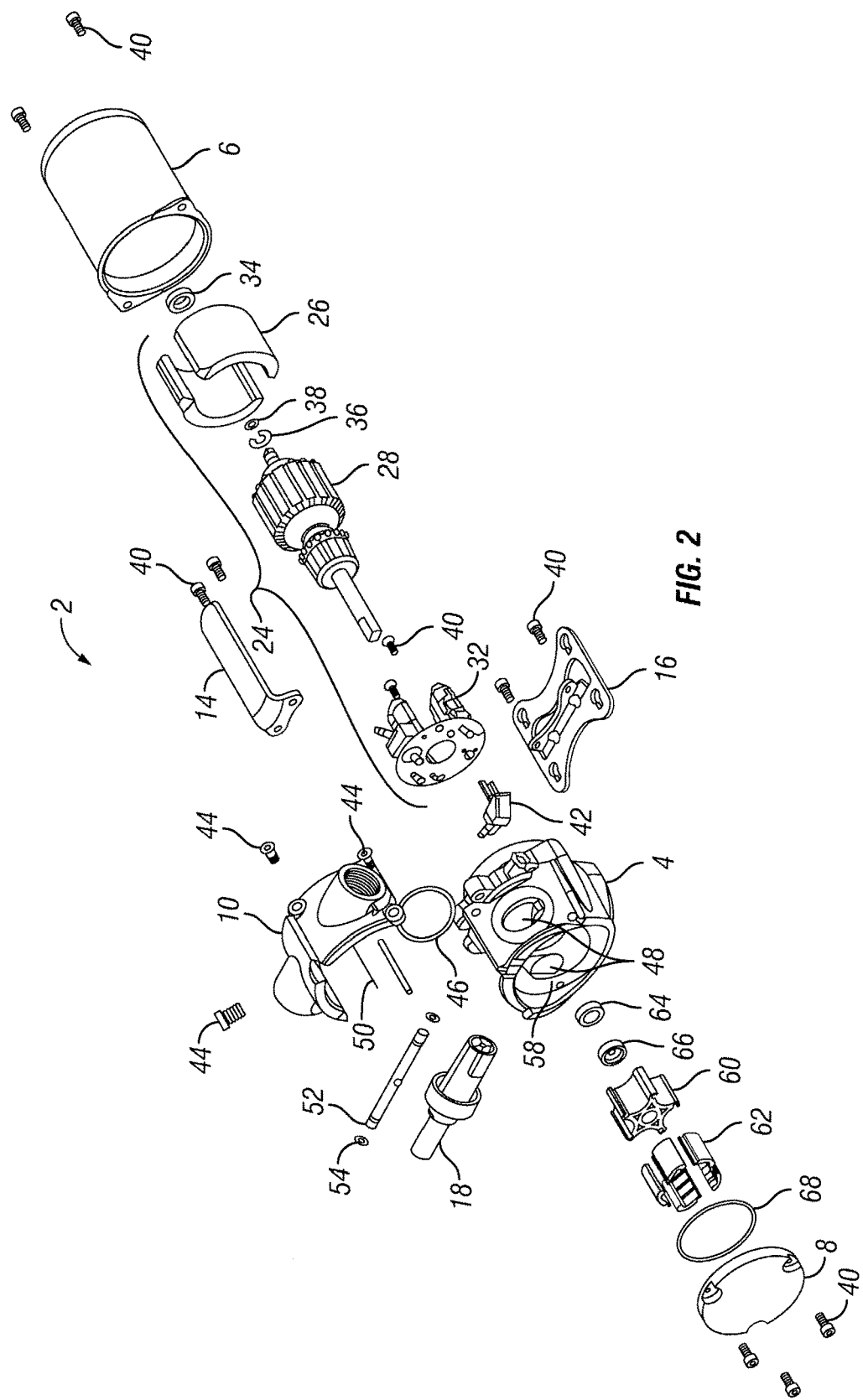
FIG. 2 is a perspective exploded view of the portable fuel pump.

An exploded view of pump 2 is shown in FIG. 2. Like FIG. 1, this view shows pump housing 4, motor housing 6, rotor cover 8, inlet and outlet port flanges 10 and 12, respectively, handle 14, base bracket 16, and power cord 18. This view further shows the components of motor assembly 24 including magnets 26, armature 28, rotary shaft 30, and brushcard assembly (brush holder/circuit board) 32 which includes brushes, shunt wires, brush holders, switch, thermal/motor overload protector, electrical pin receptacles and PCB. Bearing 34, e-ring retainer 36, and elastomeric retaining ring 38 round out illustrative components of motor assembly 24. As this view shows, illustrative fasteners 40 attach motor housing 6 to pump housing 4. Similarly, additional fasteners 40 attach handle 14 and base bracket 16 to pump housing 4. It is appreciated that fasteners 40 may be all the same or of different size and configuration depending on the needs of the pump. Likewise, additional fasteners 40 attach rotor cover 8 onto pump housing 4. A junction 42 is attached to power cord 18 and brushcard assembly 32. Because inlet and outlet port flanges 10 and 12, respectively, are adjustable with respect to pump housing 4, they may be illustratively attached thereto via fasteners 44. Additionally, flange seal 46 may follow the periphery of openings 48 in pump housing 4 that are in fluid communication with ports 20 and 22 that allow fluid to go into and out of pump housing 4.

An inlet screen 50 may be placed between inlet port 20 and opening 48 in pump housing 4 to keep any solid debris out of the same. A switch actuator 52 may be located in pump housing 4 with actuator seals 54 about the periphery adjacent each end of same. It is appreciated that switch actuator 52 may engage toggle switch 56 to activate pump 2. Pump cavity 58 in pump housing 4 is in fluid communication with ports 48 and rotor 60 may be located and coupled to rotary shaft 30. Hinged vanes 62 pivotally attach to rotor 60 to move fluid from the inlet port 20 to outlet port 22. Also, as part of the assembly, is bearing 64 and seals 66 and 68 to prevent fluid from leaking.

Figure 3:
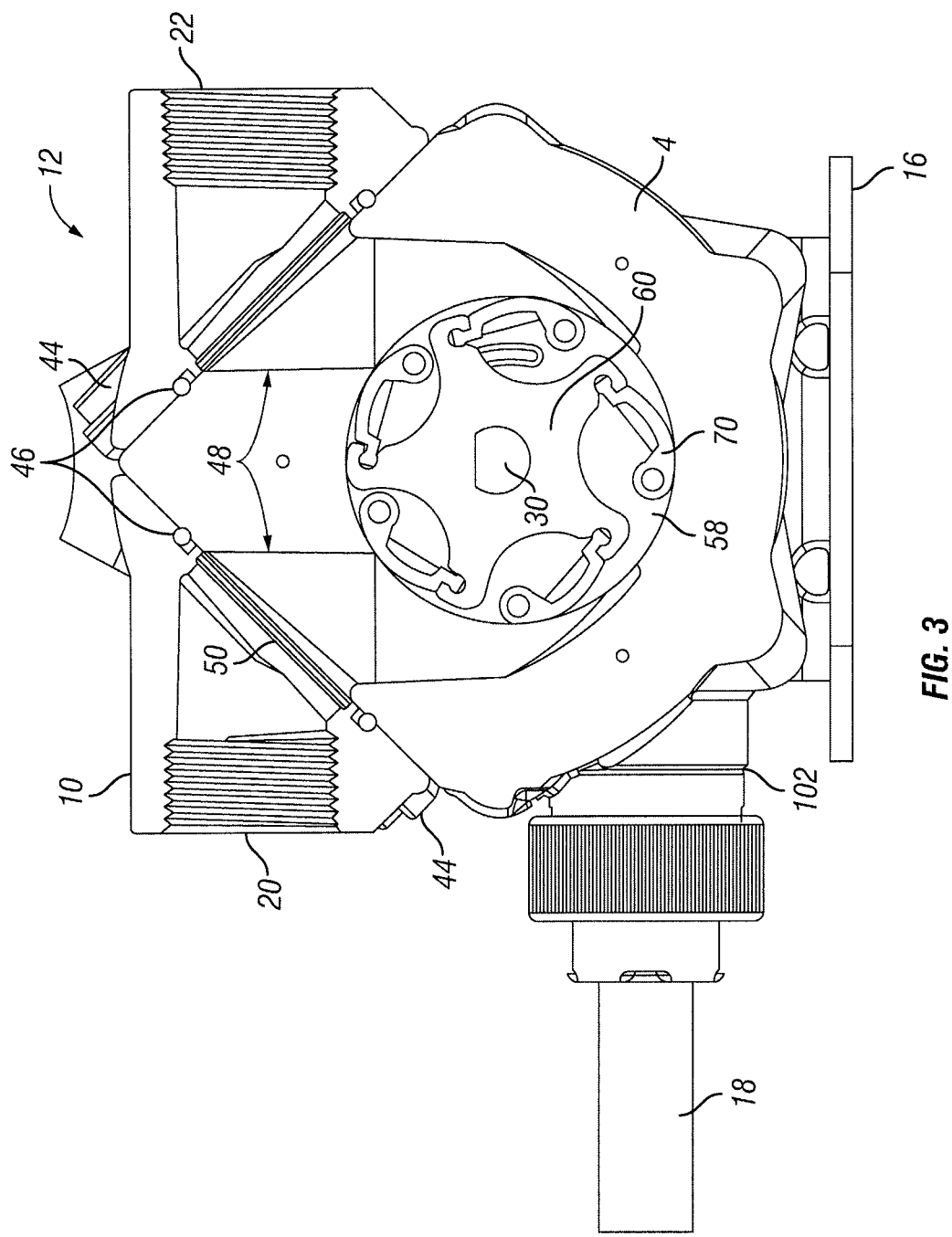
FIG. 3 is a cross-sectional elevation view of the portable fuel pump showing an embodiment of the rotor and vanes and the inlet and outlet ports located in a tandem configuration.

An embodiment of the present disclosure includes adjustable inlet and outlet port flanges 10 and 12, respectively. These flanges, which include ports 20 and 22, may be attached in a variety of orientations to make the versatility of pump 2 that much greater. As shown in FIG. 3, ports 20 and 22 are positioned in a co-axial-type arrangement so that the inlet and outlet form a straight line as shown. It is appreciated that flanges 10 and 12 are selectively attachable to pump housing 4 via fasteners 44. Flange seals 46 are positioned on flanges 10 and 12 between ports 20, 22, and 48, to prevent any fluid from leaking between housing 4 and flanges 10 and 12 during fluid delivery. Also, an inlet screen 50 is positioned between inlet 20 and opening 48 to prevent debris from entering cavity 58, as previously discussed.

Figure 4:
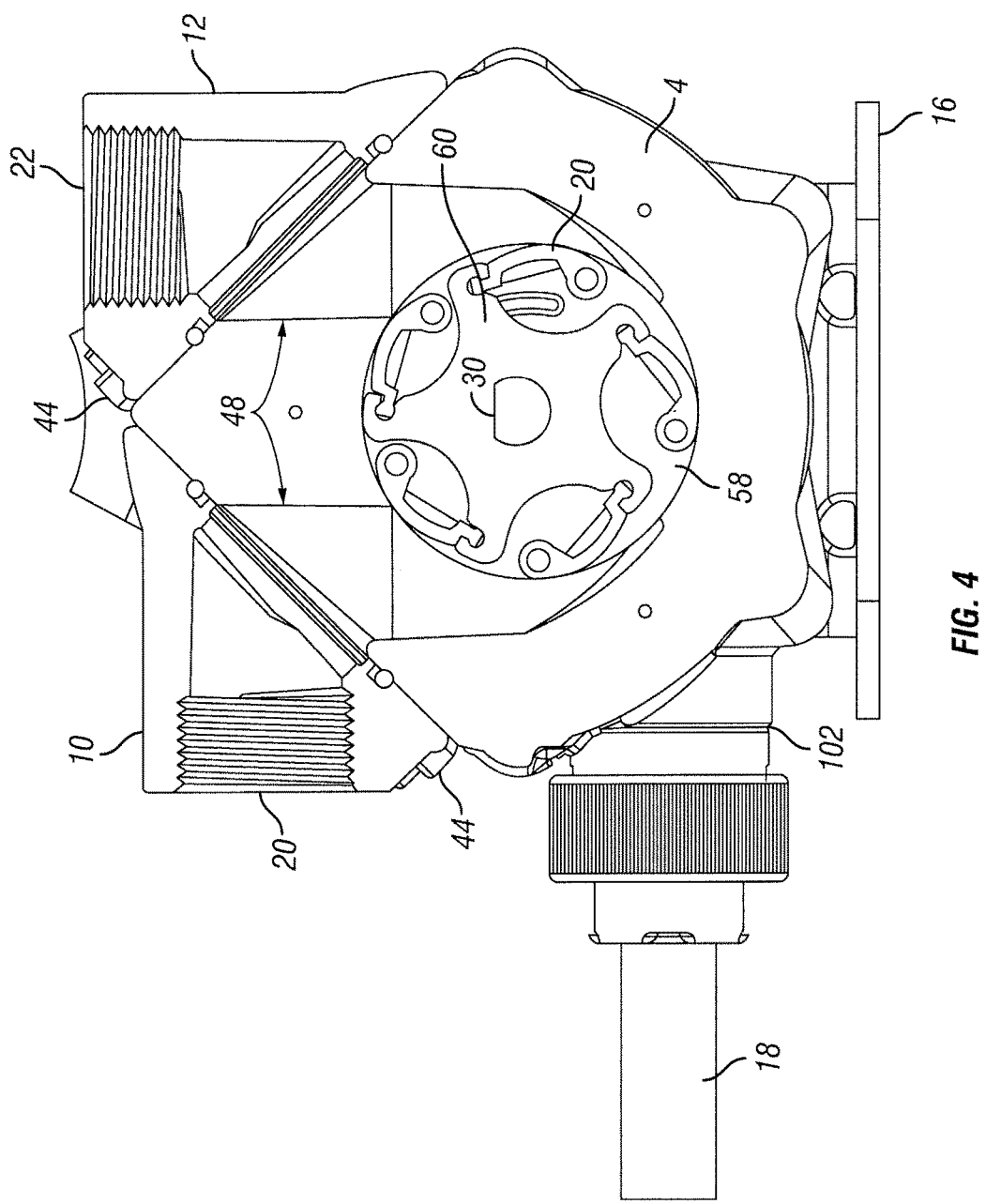
FIG. 4 is another cross-sectional front elevation view showing the outlet port positioned about perpendicular to the inlet port.
Figure 5:
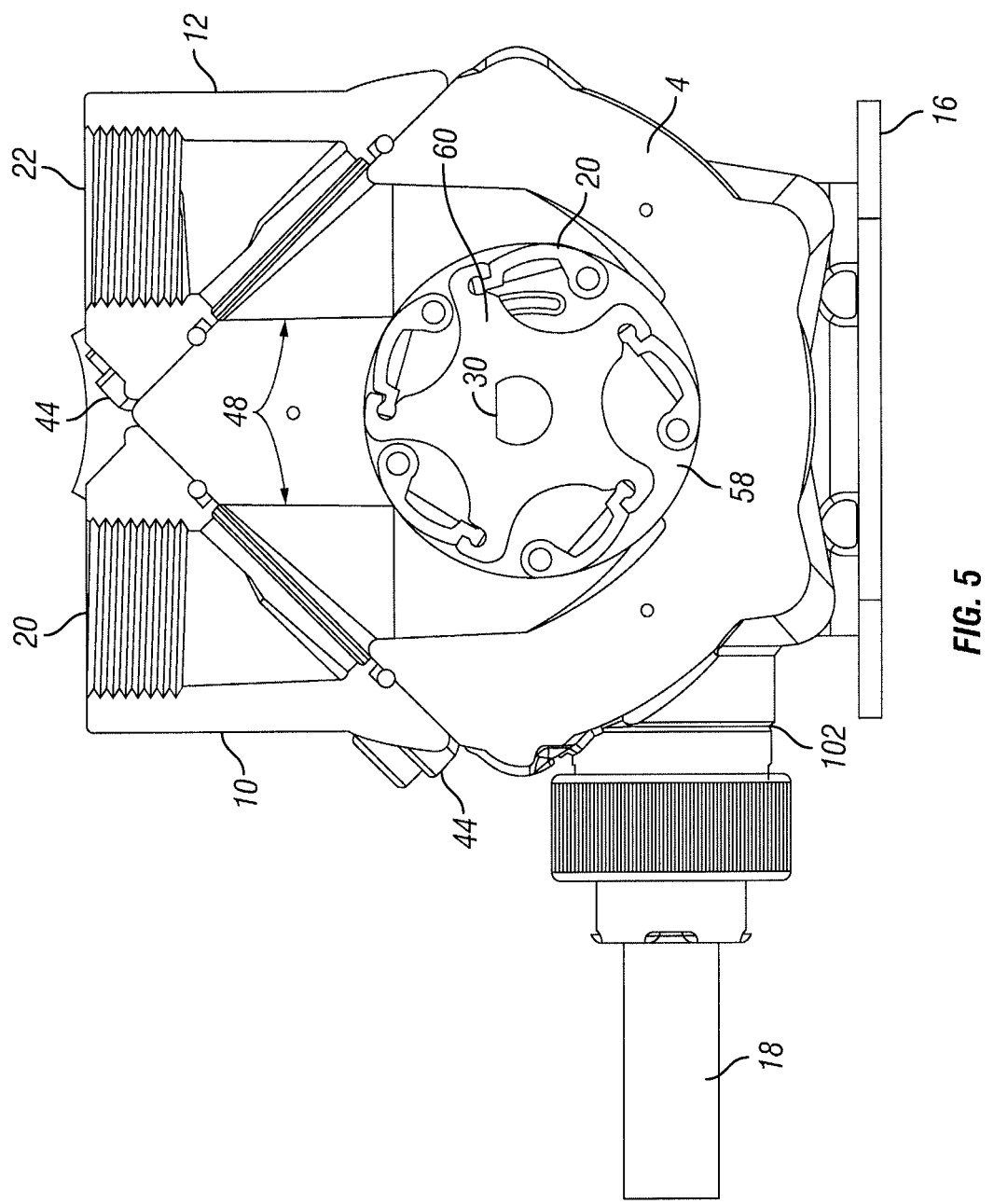
FIG. 5 is another cross-sectional front elevation view of the pump showing both the inlet and outlet ports adjusted to a parallel condition with each other.
Figure 6:
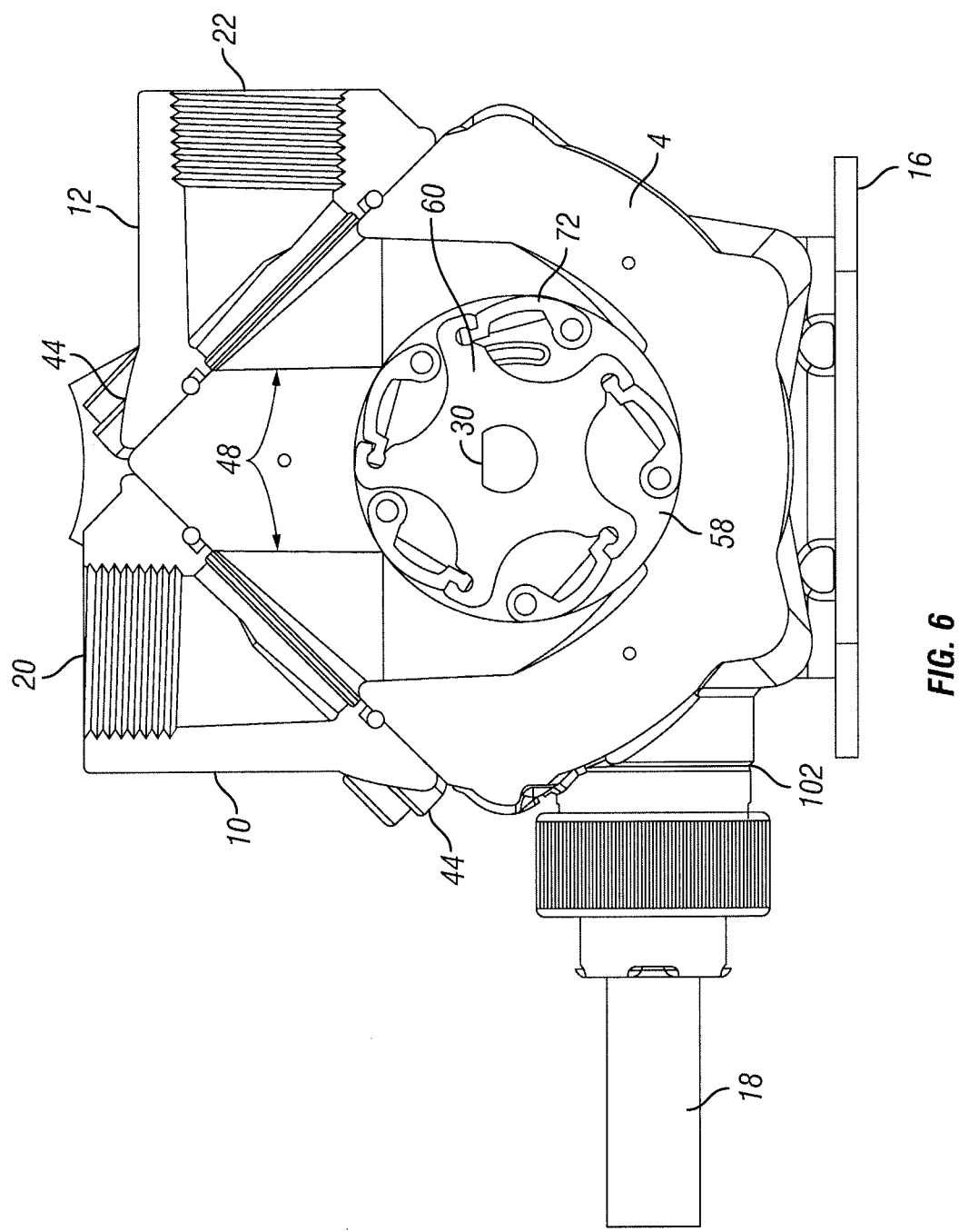
FIG. 6 is another perspective view of the portable fuel pump, showing the inlet port located about perpendicular to the outlet port, opposite the positioning shown in FIG. 19.

The view shown in FIG. 4 demonstrates the adjustability of inlet and outlet port flanges 10 and 12. For example, here port flange 10 is located in the same position as that shown in FIG. 3, but flange 12 has been rotated so outlet port 22 extends essentially perpendicular to port 20. It is also evident in this view how regardless of how flanges 10 or 12 are moved, their associated ports always maintain fluid communication with cavity 58 via openings 48. Further, the view in FIG. 5 now shows flange 10 moved to an upright position being now parallel to flange 12. Again, ports 20 and 22 maintain their fluid communication with openings 48 maintaining fluid communication with pump cavity 58. As shown in FIG. 6, flange 12 is adjusted back essentially 90 degrees from flange 10 making port 22 essentially perpendicular to port 20. This is again accomplished while maintaining fluid communication with opening 48. Accordingly, the versatility of these independently adjustable ports is evident.

Figure 7C:
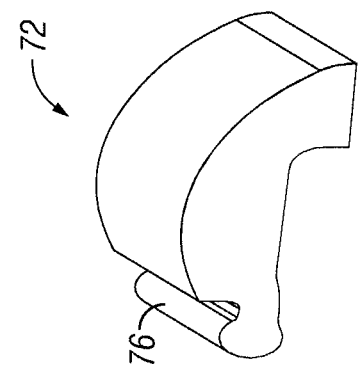
FIGS. 7*a* through *c* are perspective views of three different embodiments of a rotor vane.
Figure 7B:
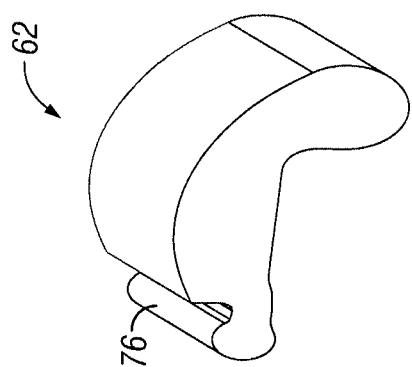
Figure 7A:
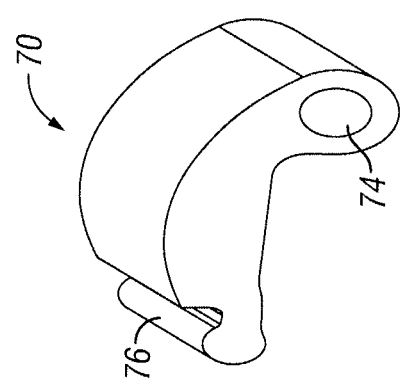

In another illustrative embodiment of the present disclosure, pump 2, and particularly rotor 60, are configured to accommodate a variety of vane configurations. For example, as FIG. 7 shows, three illustrative embodiments of vanes 62, 70, and 72 may be pivotally coupled to rotor 60. The ability to change the vanes may accomplish different flow rates and discharge pressures which may be useful for compatibility with a variety of chemical fluids or downstream plumbing configurations. The vanes may be made with different materials which could change their rotary mass, thus increasing or decreasing flow without changing motor characteristics. As shown, vane 70 includes an encapsulated rod 74 which increases vane 72's mass. This increased mass increases the output flow of pump and available discharge head 2. Vane 62 is similar to that of vane 70, except that no encapsulated rod 74 is included. This means there will be a different flow output than if vane 70 is used. Lastly, vane 72 has a portion of its lobe removed further decreasing its mass and modifying the vane's geometry, which decreases the flow output. It is appreciated that the vanes may be further configured to affect the flow rate of chemicals based on the vanes' mass and geometry.

Figure 8:
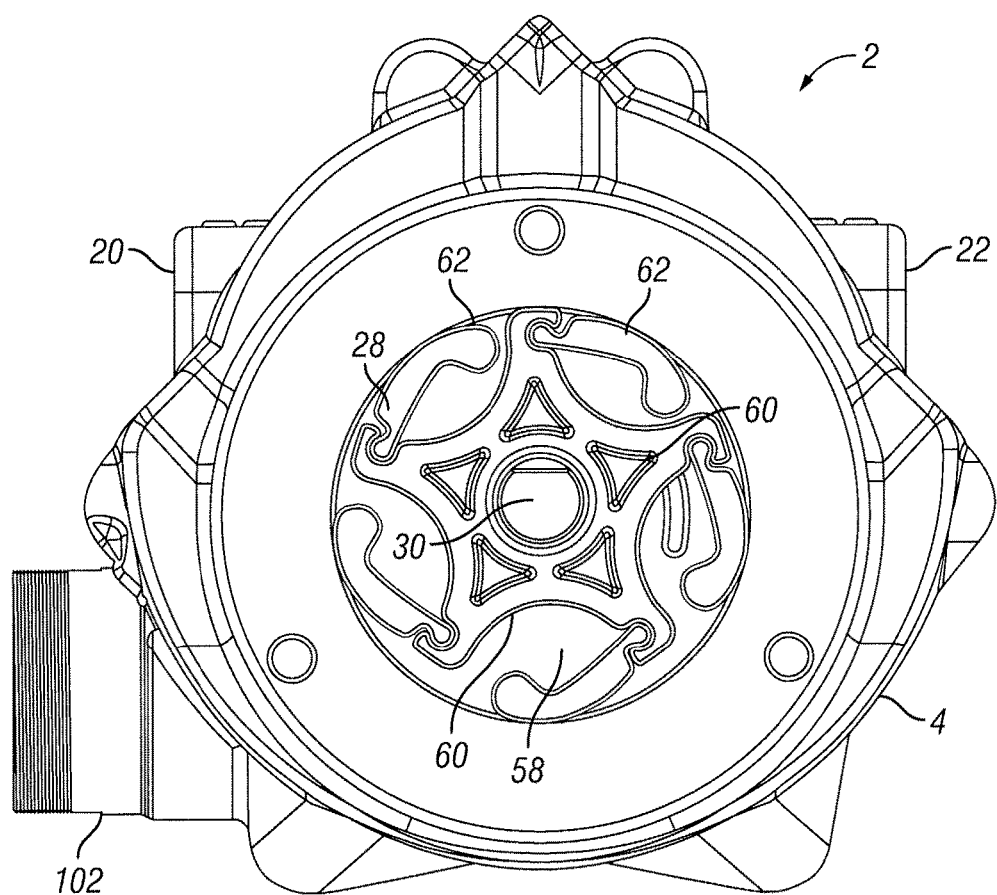
FIG. 8 is a cross-sectional forward elevation view of the pump showing the vane from FIG. 7*b* attached to a rotor.
Figure 9:
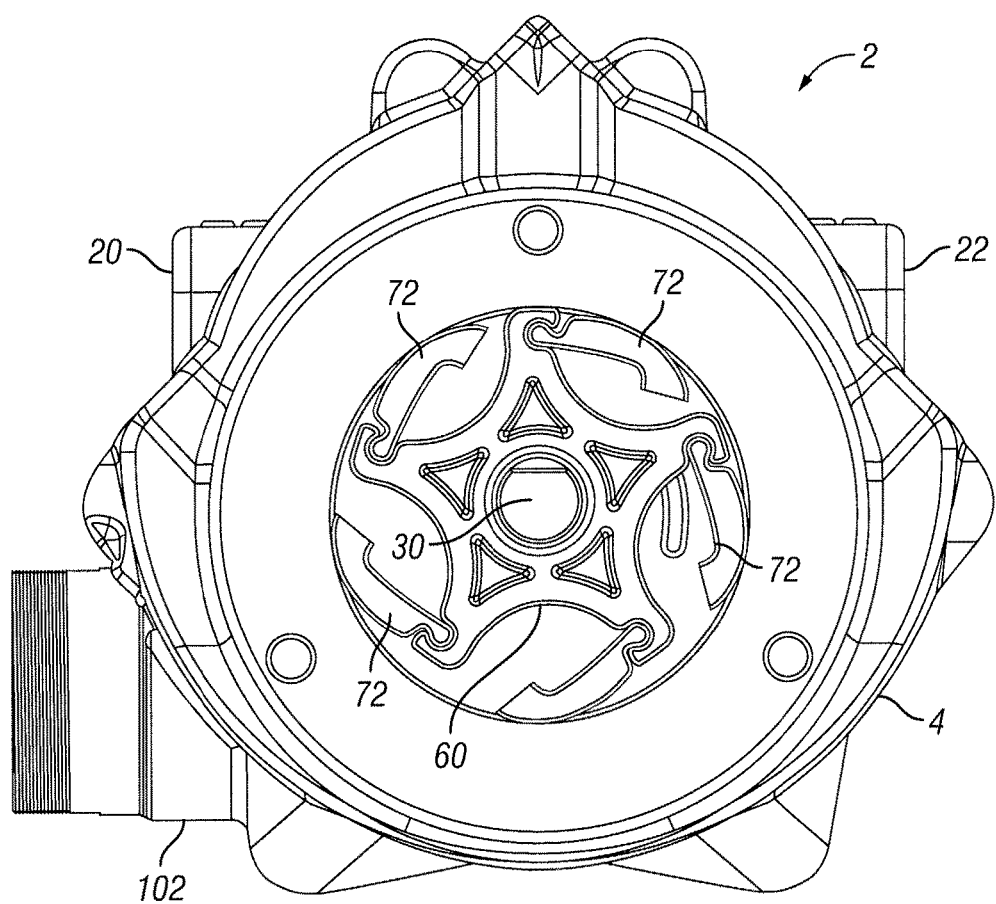
FIG. 9 is another cross-sectional front elevation view of the portable fuel pump showing the vane from FIG. 7*c* coupled to the rotor.
Figure 10:
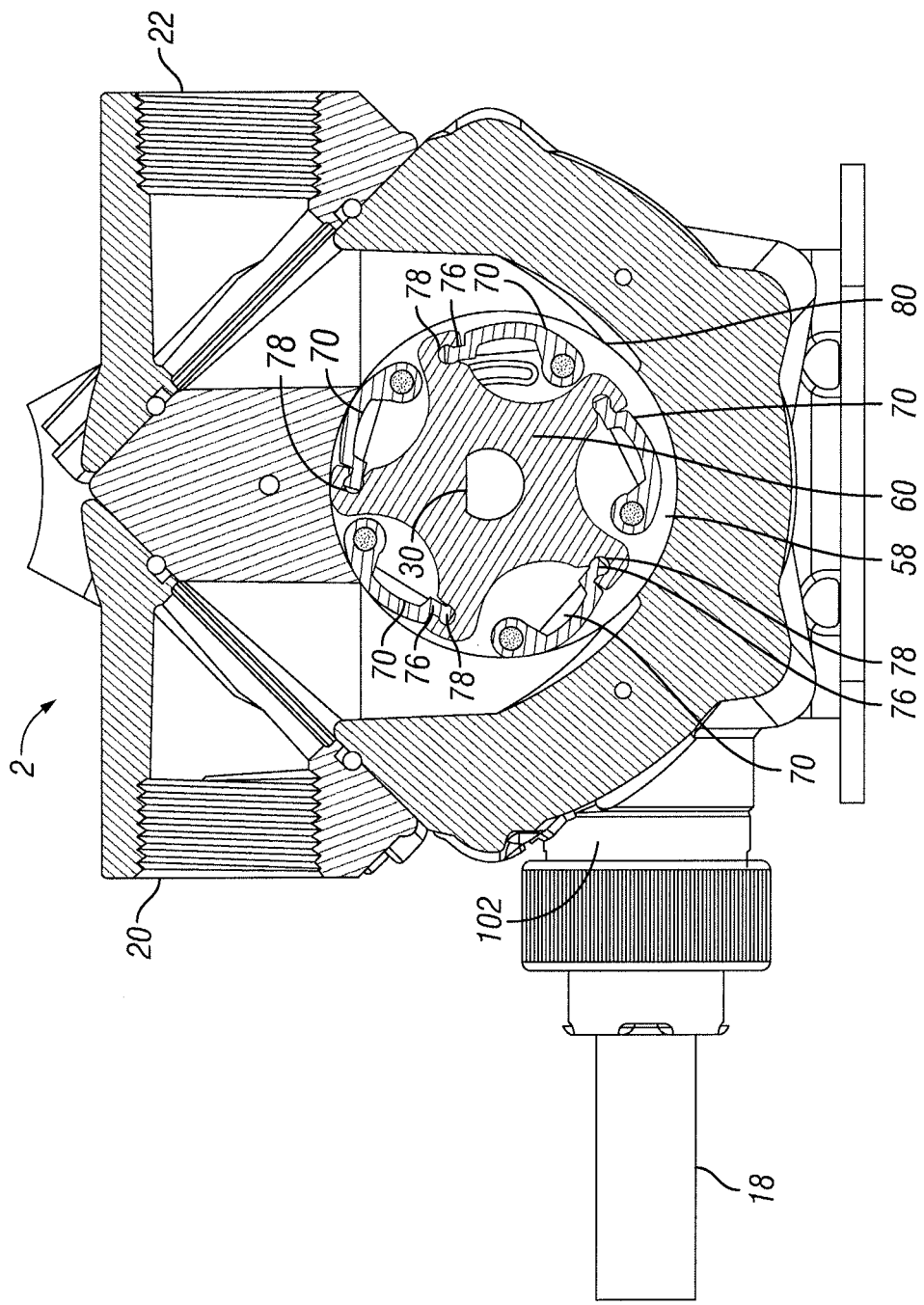
FIG. 10 is another cross-sectional view of the portable fuel pump showing the vanes of FIG. 7a coupled to the rotor and how the hinge configuration between the vane and rotor contributes to not requiring a bypass valve.

Each vane includes a pivot pin-like structure 76 in each vane and is configured to be received in a receptacle 78 in rotor 60. This creates a modular fitting for any of the vanes while allowing them to pivot with respect to rotor 60. The view of pump 2 in FIG. 8 shows vane 62 coupled to rotor 60. Similarly in FIG. 9, vanes 72 are substituted for vane 62 or 70 in the same rotor 60. This demonstrates the modularity of the different vanes for use with rotor 60.

Another illustrative embodiment of the present disclosure includes the ability to no longer require a relief valve if the outlet port 22 is closed off. Conventionally when this happens, a bypass valve exists so there is no pressure generated on the drive mechanism by the rotor and vanes continue to pump fluid. In this case, because each vane 70 (also applies to vanes 62 and 72) is hinged on rotor 60 at 78 via pivot pin 76, if the outlet is closed off, vanes 70 are unable to seal off cavity wall 80 due to the pressure. Without this seal, vanes 70 will continue to rotate and pressurize fluid at the outlet, but will not move any fluid. Depending on the predetermined outlet pressure dictated by vane mass and geometry, the vanes will continue to relieve themselves until an equilibrium position is reached, which means there is no longer any need for a bypass valve. If outlet port 22 opens again, the outlet pressure will drop, making the vanes' seal cavity wall 80 or ride on a thin fluid film bearing (depending on the downstream configuration) again and begin moving fluid. This also makes the hinged vanes self-regulating by reacting to the outlet pressure.

Figure 11:
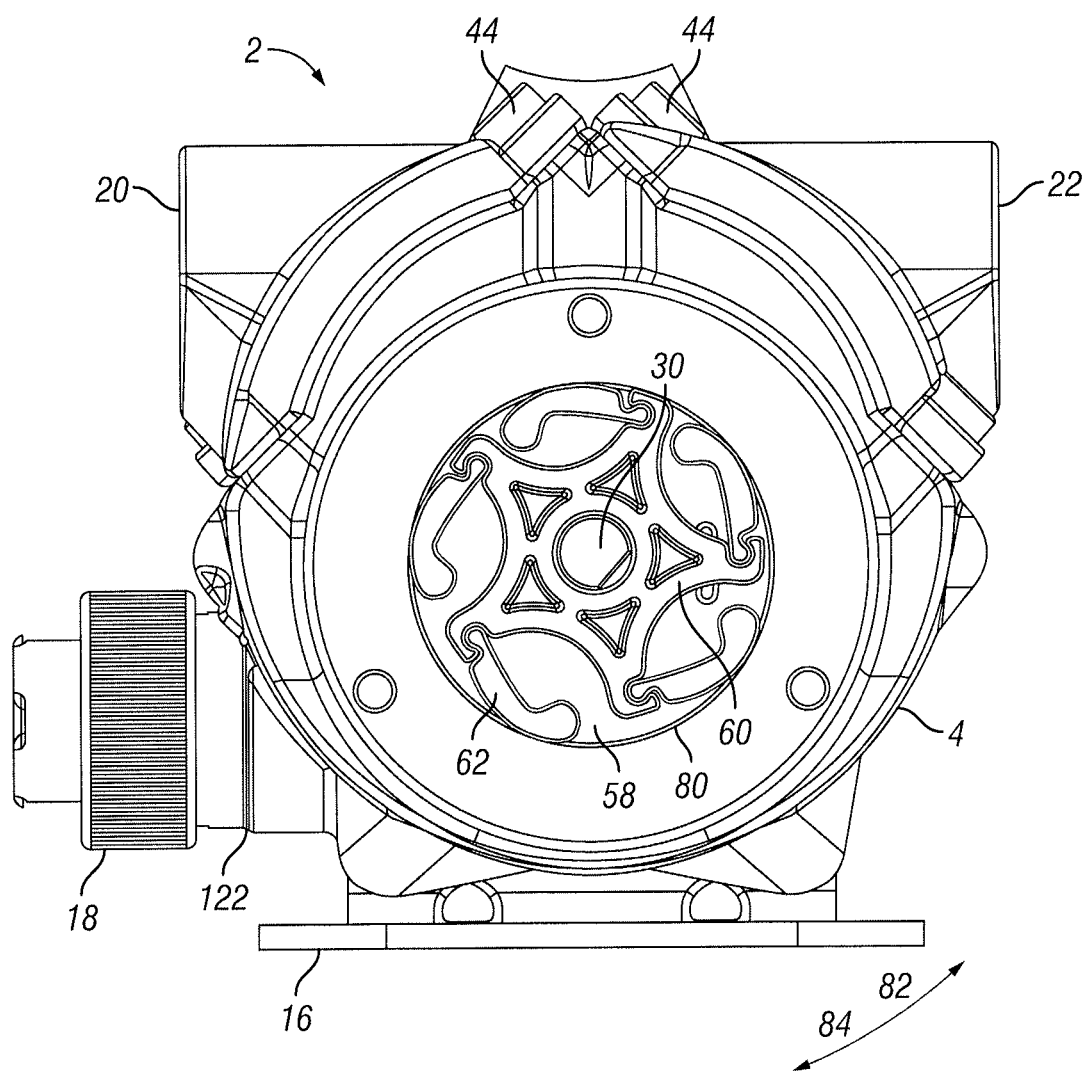
FIG. 11 is another cross-sectional forward elevational view of the portable fuel pump showing how the rotor and vanes may be configured to rotate both clockwise and counterclockwise.

In another embodiment, pump 2 may include a reversible rotor 60 and vanes 62 (or alternatively vanes 70 and 72). The end view shown in FIG. 11 is an elevation view of cavity 58 with rotor 60 driving vanes 62 in direction 82 to move fluid out of outlet port 22. In this case, when rotating rotor 60 in direction 82 the pump still functions, but the vanes do not de-latch from cavity wall 80, so there is no bypass function. If the direction of motor rotation was reversed and rotor and vanes were reversed (as mentioned above), the pump would turn in direction 84 and be fully functional with the bypass feature.

Figure 12:
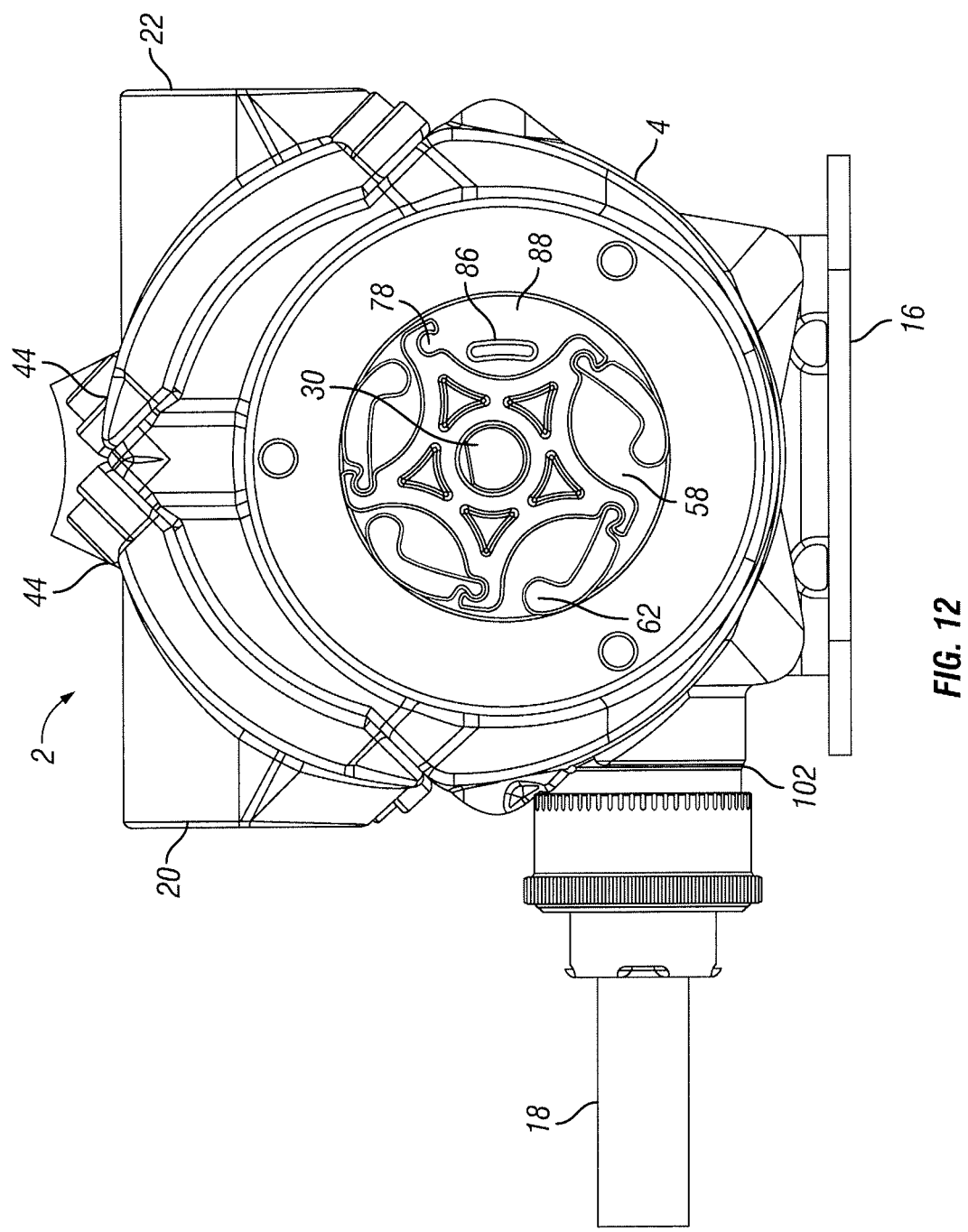
FIG. 12 is another cross-sectional forward elevational view of the portable fuel pump showing the rotor and vanes with one vane removed for illustrative purposes to show a high pressure relief gland located in the pump cavity.
Figure 13:
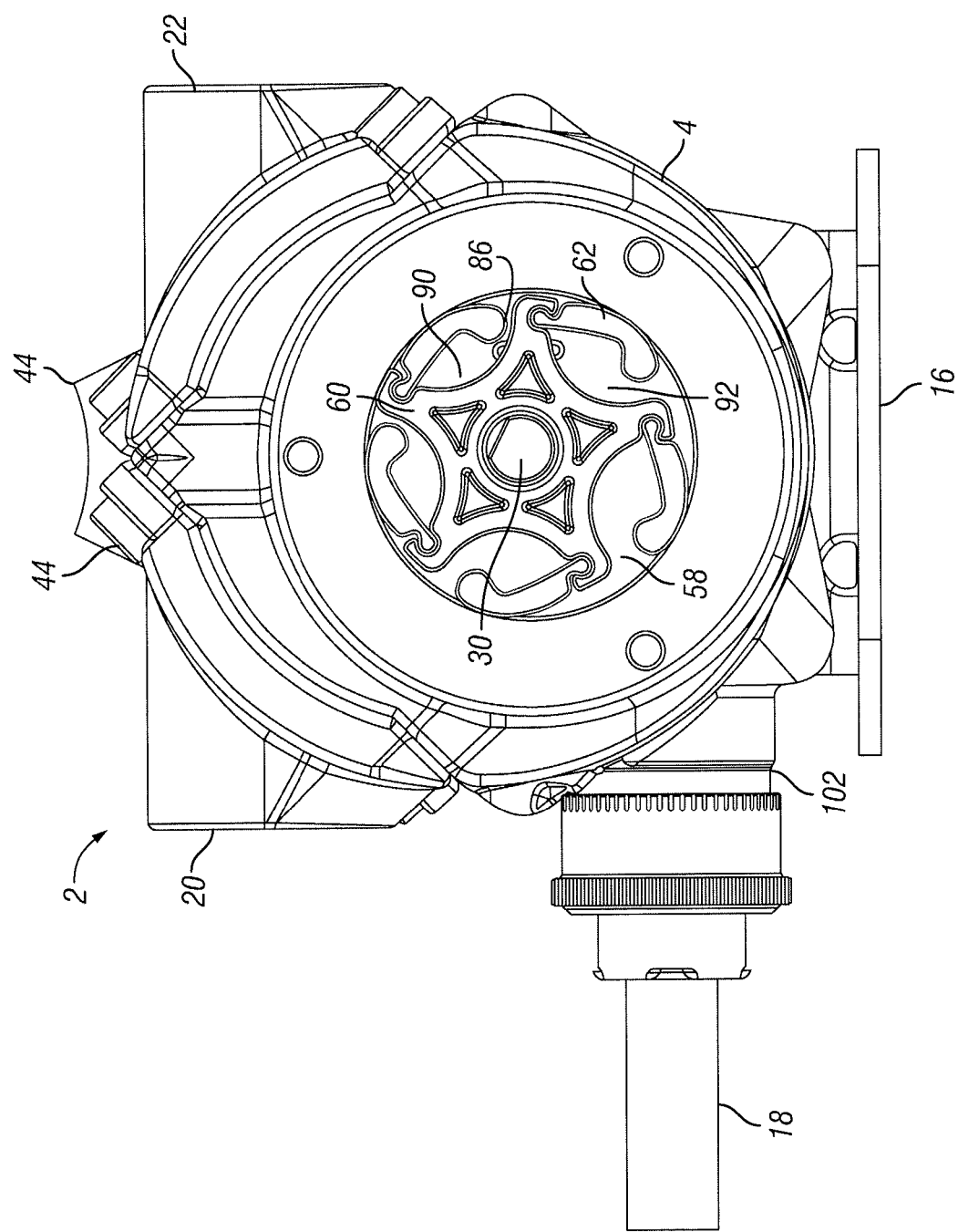
FIG. 13 is another cross-sectional front elevation view of the portable fuel pump showing the rotor and vanes positioned such the high pressure relief gland is in communication with both an upper and lower chamber while still sealing off the prior volumetric cavity between vanes to the inlet port so as to create dry suction lift necessary to self-prime.

The end views of pump 2 shown in FIGS. 12 and 13 assist illustrating another embodiment of the same that includes a high pressure relief gland 86 which is illustratively located in the floor 88 of cavity 58. This gland 86 allows some of the fluid volume to blow back to the previous hinged cavity portion 90. (See, also, FIG. 13). As shown, rotor 60 may be positioned such that high fluid pressure from chamber 90 could be displaced into an adjacent lower chamber 92 via relief gland 86. Relieving this pressure may be useful, as it may prevent cavitation behind the trailing vane leading to a more even flow (i.e., reducing pulse).

Figure 14:
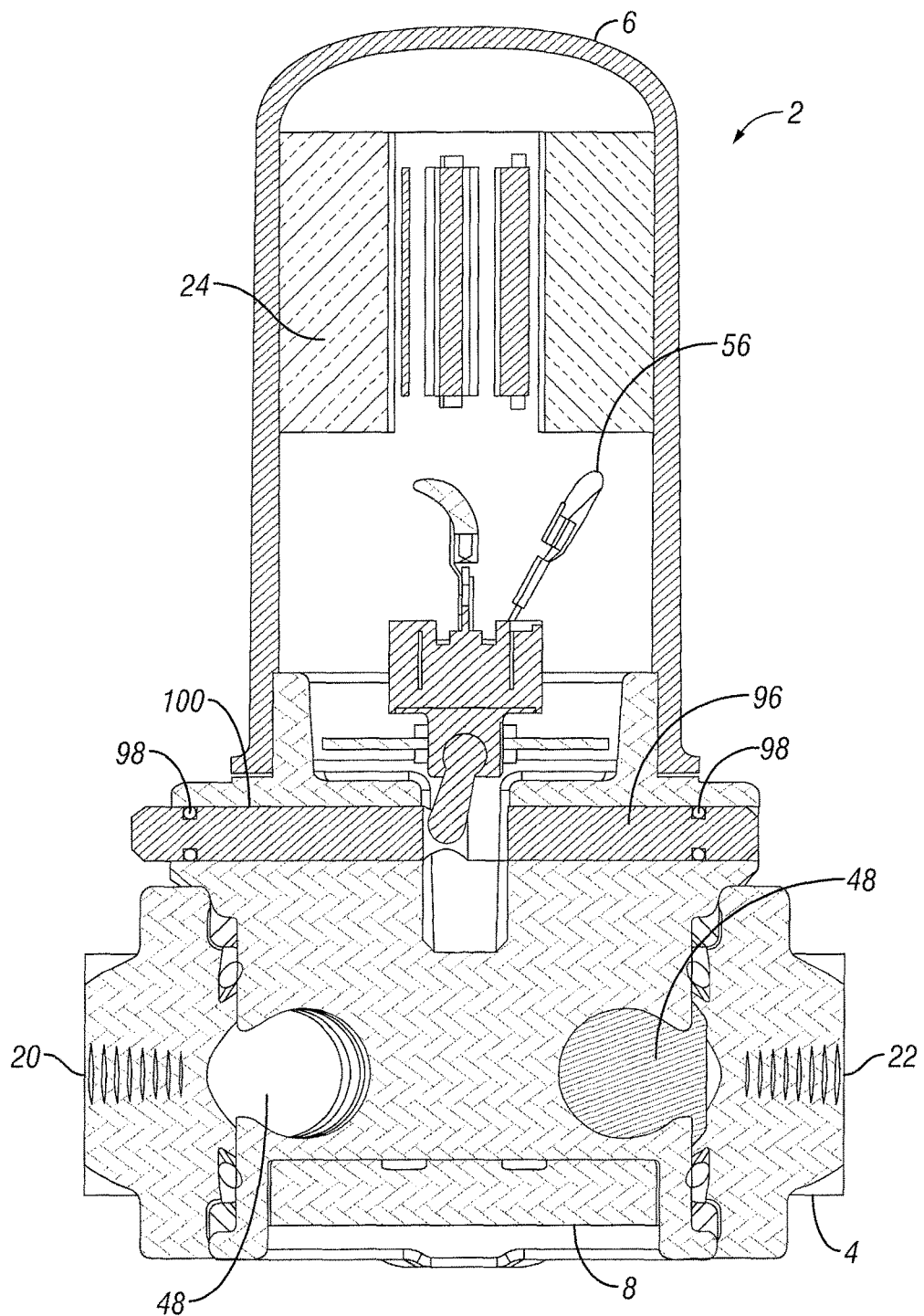
FIG. 14 is a top cross-sectional view of the portable fuel pump showing an inline toggle switch.

Another embodiment of this present disclosure is depicted in FIG. 14 showing an inline toggle switch 56. In this embodiment, switch 56 is coupled to straight rod 96. O-rings 98 are illustratively located at each end of straight rod 96 to seal cross hole 100 which is illustratively machine into housing 6 of pump 2. Rod 96 has adequate length for a two sided cylindrical flame path joint.

Figure 15:
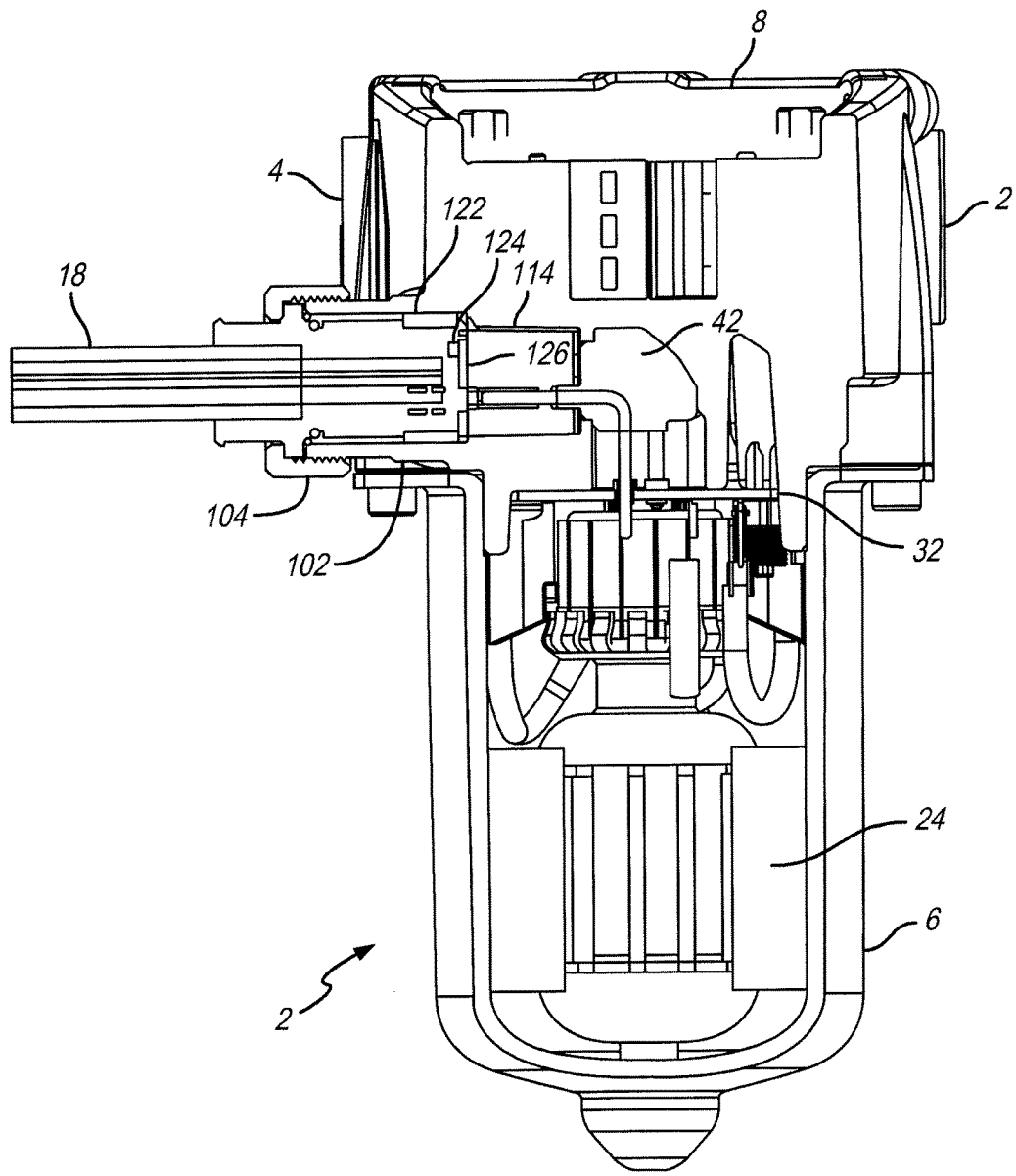
FIG. 15 is a top cross-sectional view of the portable fuel pump showing a power cord attached to a port on the motor side of the pump.
Figure 16:
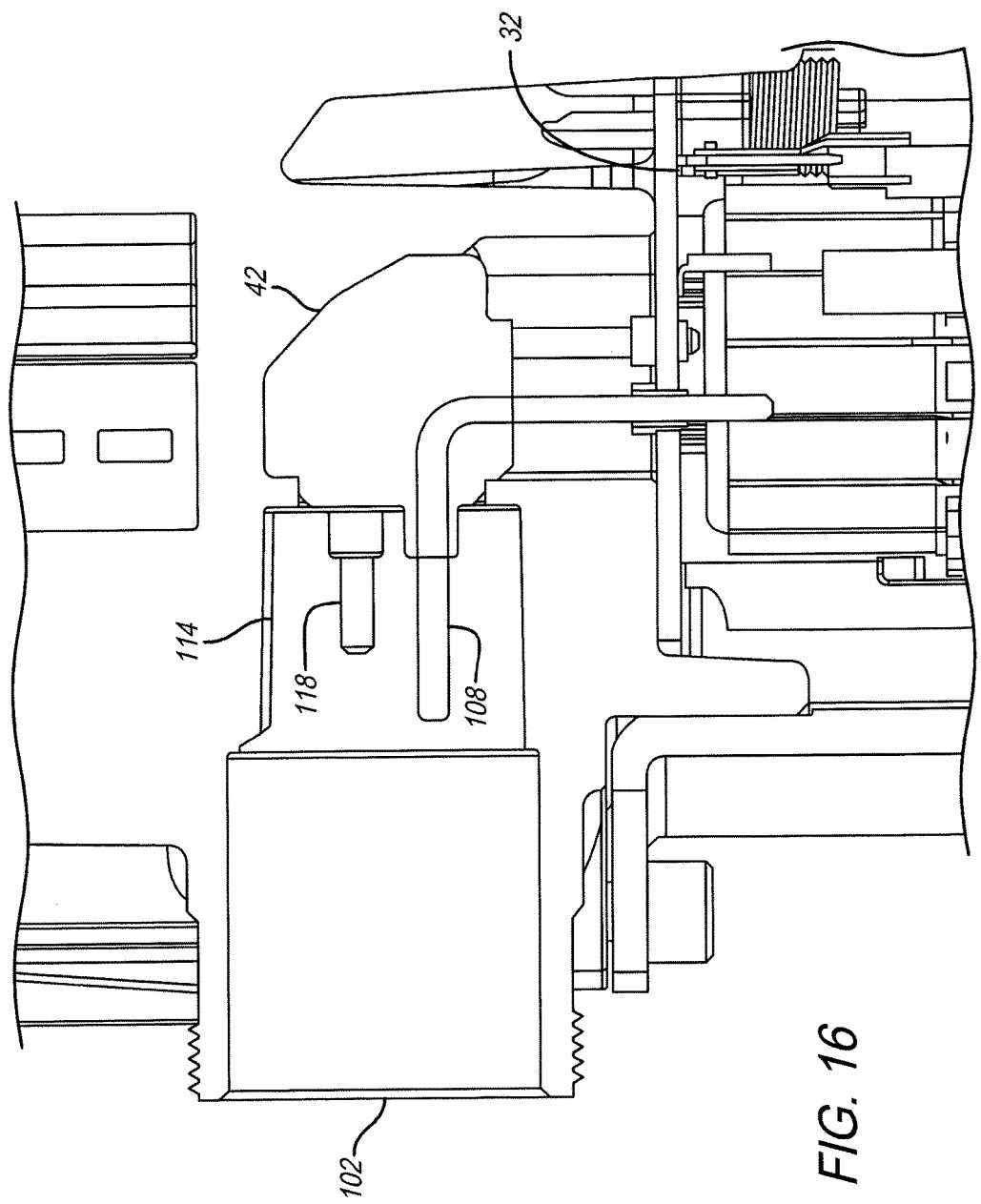
FIG. 16 is a detail cross-sectional view of the pump similar to that shown in FIG. 15 showing the power cord attached to the electrical port on the pump.

A top cross-sectional view of pump 2 is shown in FIG. 15 including power cord 18 extending into socket 102 formed in pump housing 4. As shown, junction 42 connects power cord 18 to the circuit board portion of the brushcard assembly 32 (brush holder/switch holder/circuit board) to supply power to motor assembly 24. The power cord assembly may further include a consistent orientation via a key flat 114 to guarantee proper current and grounding location in the electrical union itself. Ground pin 108 is shown in FIG. 16 at junction 42 as a longer interior potted pin than electrical contact 118, making the ground connection the first to contact when coupled, and the last to break when disconnecting the cord. A coupler nut 104 secures power cord 18 to socket 102 to create a secure and potentially weather tight seal. A flame path dimensional compliant ring 122 is an integral part of the plug socket itself being encapsulated within the molded plug housing. It is appreciated that the ring 122 may be made of any UL compliant materials such as aluminum, brass, bronze, steel, and stainless steel. This allows for a UL compliant flame path between the power cord and the pump housing. A PCB 126, which in turn houses a capacitor 124 to provide EMI shielding to the pump, is also provided. Capacitor 124 provides an effective means of suppressing EMI at the entrance of the incoming power connection. Capacitor 124 is coupled to both power leads, as well as the grounding lead. The PCB 126 is located in a position that provides solid contact between the ground plane of the board (which is connected to the grounding lead) and an exposed grounding surface in the mating housing. By grounding the board that houses the capacitor in this manner, the EMI is effectively suppressed.

Figure 17:
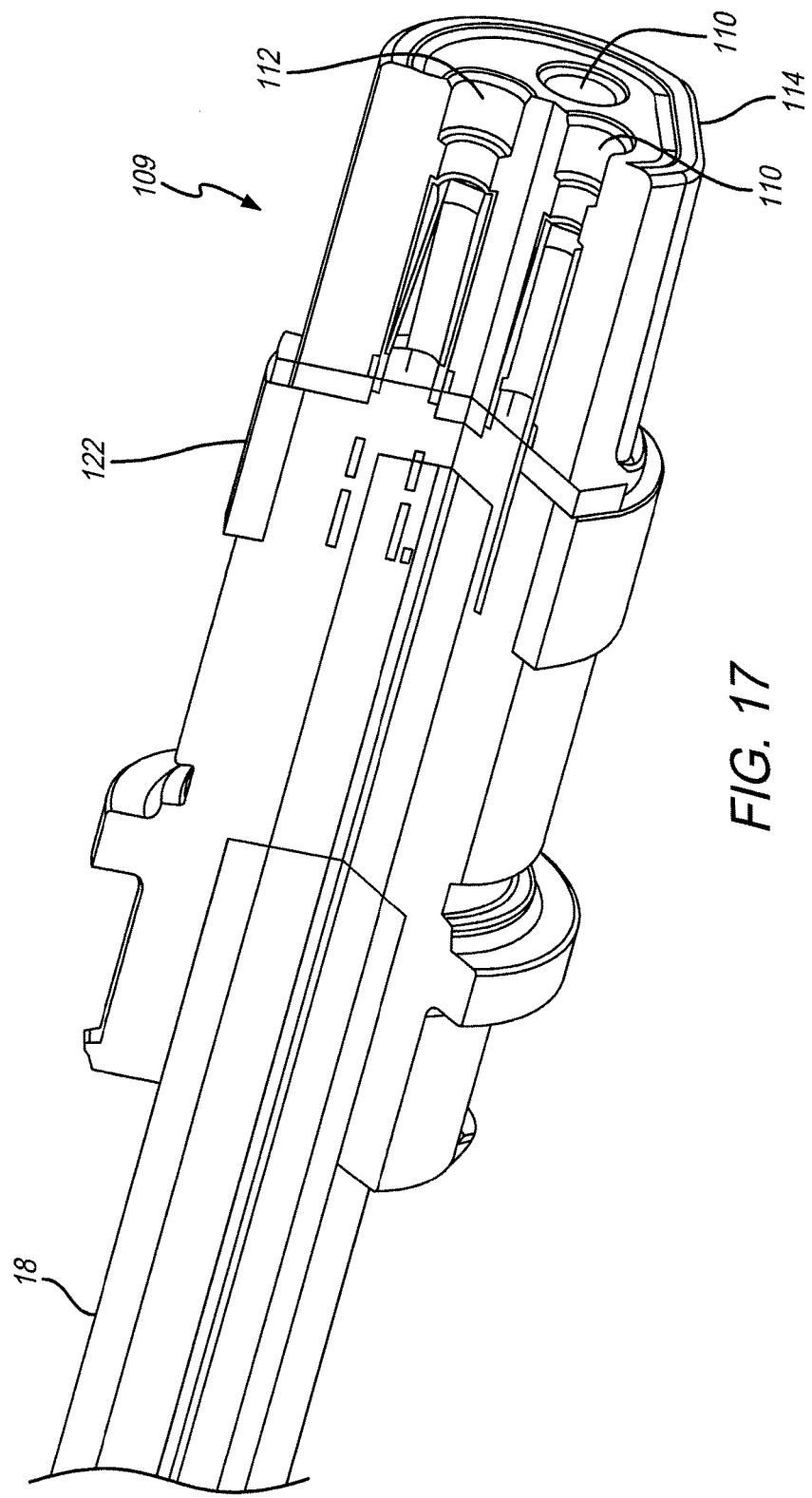
FIG. 17 is a perspective partially cutaway view of the power cord and jack.
Figure 18:
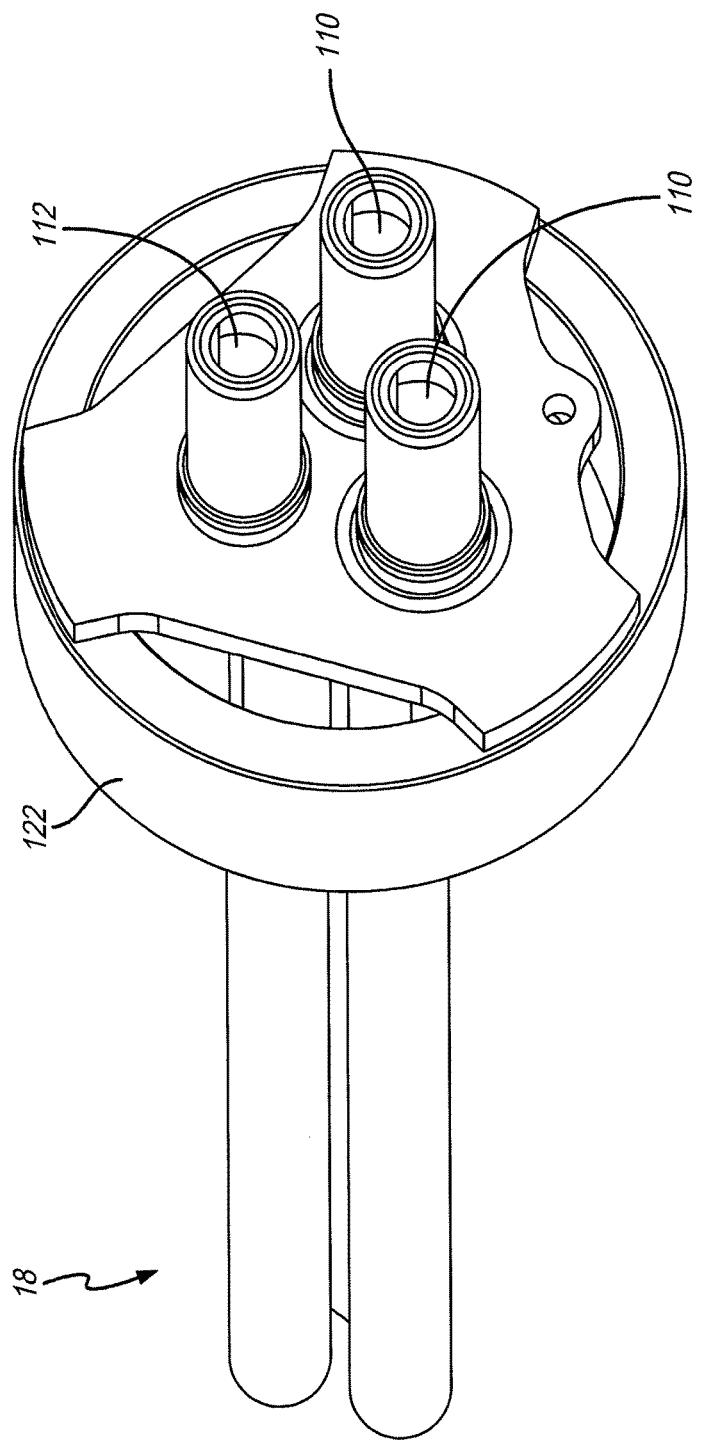
FIG. 18 is an isolated detailed view of a portion of the jack used on the power cord, as well as the ring used for creating a cylindrical flame path joint in the junction box area and the PCB, receptacles, and capacitor mounted in a fashion to suppress electromagnetic interference.
Figure 19:
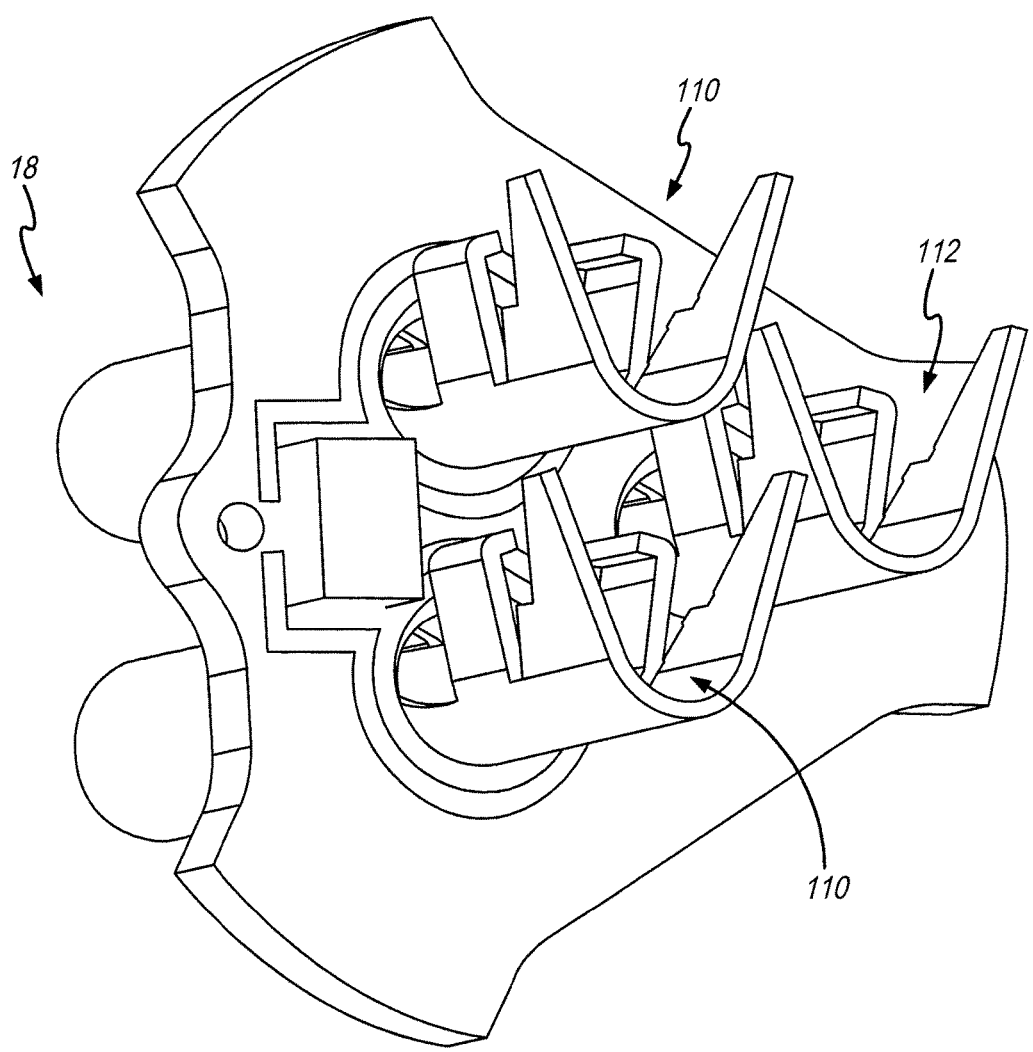
FIG. 19 is an isolated perspective view of the receptacle located in the plug socket to receive the power cord jack.

A detail view of power cord 18 engaging junction 42 to supply power to circuit board portion of brushcard assembly 32 is shown in FIG. 16. Cord 18 and associated structures to cord 18 are shown in FIGS. 17-19 including outlet 109 with receptacles 110 and receptacle 112. Wiring and routing of motor enclosures, especially of the explosion-proof type, present many difficulties in a manufacturing environment and can consume a significant amount of space in a product design. By integrating a majority of the necessary components into a single pre-routed and assembled brushcard assembly 32 and providing a means to connect to mating electrical components, the final assembly is greatly simplified and the overall space constraints of said assembly are significantly condensed. With the right angle plug of junction 42 and switch rod 96 already installed in the pump/motor housing, the brushcard assembly 32 can then be installed and fastened in place using fasteners as illustratively shown in FIG. 2. This action simultaneously establishes all electrical connections between the brushcard assembly 32 and the pins of junction 42, engages switch rod 96 with toggle of switch 56 (mounted on PCB of brushcard assembly 32), and completes the ground connection to the housing through the fasteners that hold the brushcard assembly 32 in place. Once in place, the brushcard assembly can create a cover over the potting cavity that junction 42 dwells in, so as to create a guided means of potting over junction 42 to complete explosion-proof motor construction requirements.

Although the present disclosure has been described with reference to particular means, materials, and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A pump comprising:
   a motor assembly;
   a rotor attached to the motor assembly that rotates the rotor;
   a plurality of vanes each pivotally coupled to the rotor so as the rotor rotates, the vanes selectively push fluid to an outlet port;
   a power cord with a power cord outlet that supplies power to the motor assembly;
   wherein the power cord outlet includes at least one receptacle;
   a power cord connector that transmits power from the power cord and to the motor assembly;
   wherein the power cord connector includes a ground pin extending therefrom;
   wherein the ground pin is configured to contact the at least one receptacle of the power cord before any electrical contact is made between the power cord and the power cord connector; and
   wherein the ground pin is configured to release from the power cord after the electrical contact has been released.

2. The pump of claim 1, further comprising a coupler nut that secures the power cord to the pump, and creates a weather-tight seal between the power cord and the pump.

3. The pump of claim 1, wherein the power cord further comprises a ring, wherein the ring allows a flame path between the power cord and the pump.

4. The pump of claim 3, wherein the ring is made from a material selected from the group consisting of aluminum, brass, bronze, steel, and stainless steel.

5. The pump of claim 1, wherein engagement between a coupler nut and the power cord maintains a flame path with a ring when a connection is broken between the at least one receptacle and the power cord connector.

6. The pump of claim 1, wherein the power cord further includes a key flat that connects to the power cord connector in a defined orientation.

7. The pump of claim 1, further comprising a capacitor located in the power cord to provide electromagnetic interference shielding to the pump.

8. The pump of claim 7, wherein the capacitor is configured to suppress the electromagnetic interference at an incoming power connection, and wherein the capacitor is coupled to a power contact, as well as the grounding pin.

9. The pump of claim 1, wherein a junction connects the power cord to a brushcard to supply power to the motor assembly.

10. The pump of claim 9, wherein the ground pin is a potted pin making a ground connection the first to contact the power cord, and the last to break from the power cord when disconnecting the power cord.

11. A pump comprising:
    a motor assembly;
    a rotor attached to the motor assembly that rotates the rotor;
    a connector coupled to the motor assembly to supply power from a power cord to the motor assembly;
    wherein the connector includes a ground pin extending therefrom;
    wherein the ground pin is configured to make contact between the power cord and the motor assembly before any electrical contact.

12. The pump of claim 11, wherein the power cord further includes a key flat that connects to the connector in a defined orientation.

13. The pump of claim 11, further comprising a capacitor to provide electromagnetic interference shielding to the pump.

14. The pump of claim 13, wherein the capacitor is configured to suppress the electromagnetic interference at an incoming power connection, wherein the capacitor is coupled to a power contact, as well as the grounding pin.

15. The pump of claim 11, wherein a junction connects the power cord to a brushcard to supply power to the motor assembly.

16. The pump of claim 15, wherein the ground pin is a potted pin making a ground the first to contact the power cord, and the last to break from the power cord when disconnecting the power cord.

17. The pump of claim 11, wherein the ground pin is configured to release from the connector after the electrical contact has been released.

18. A pump comprising:
    a motor assembly located within a pump housing for operating the pump;
    a power cord;
    a junction coupled to the motor assembly located in the pump, accessible from exterior of the pump, and selectively attachable to the power cord, to supply power from the power cord to the motor assembly;
    wherein the junction includes a ground pin and at least one electrical contact both extending therefrom; and
    wherein the ground pin extends longer than the at least one electrical contact so the ground pin makes contact with the power cord before the at least one electrical contact makes contact with the power cord.

* * * * *